March 19, 1940.  M. T. TIPSORD  2,194,411
CLAMP STICK
Filed July 18, 1935  2 Sheets-Sheet 1
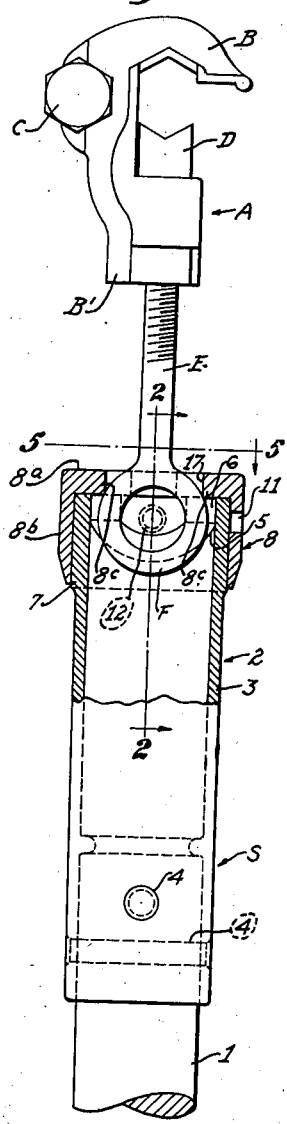
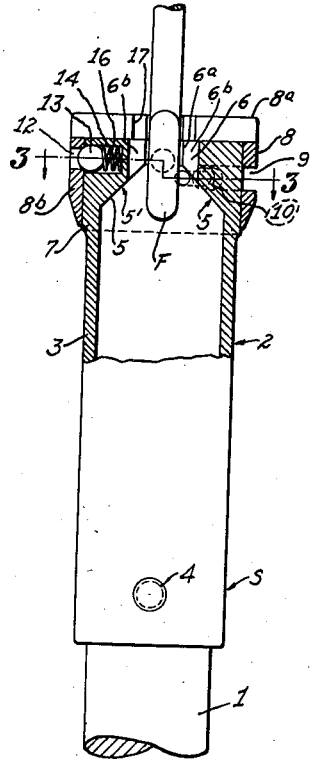
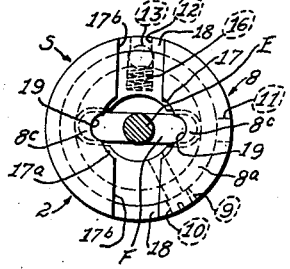
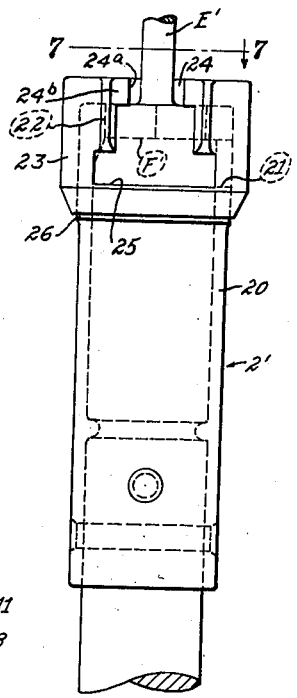
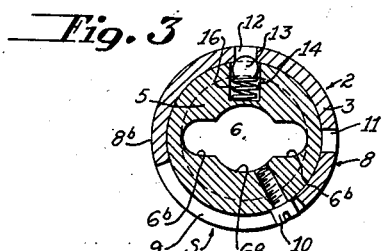
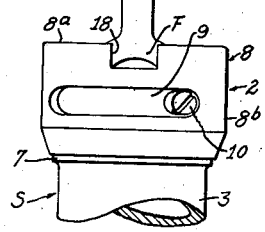
INVENTOR
MELVIN T. TIPSORD
BY E. M. Harrington
ATTORNEY March 19, 1940.　M. T. TIPSORD　2,194,411
CLAMP STICK
Filed July 18, 1935　2 Sheets-Sheet 2
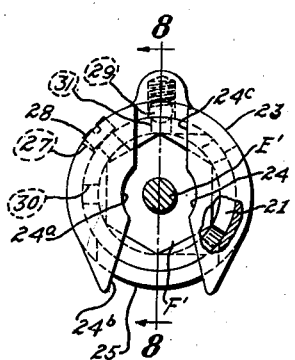
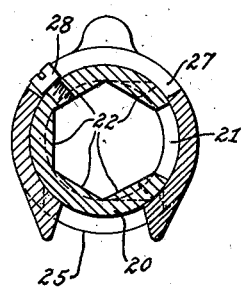
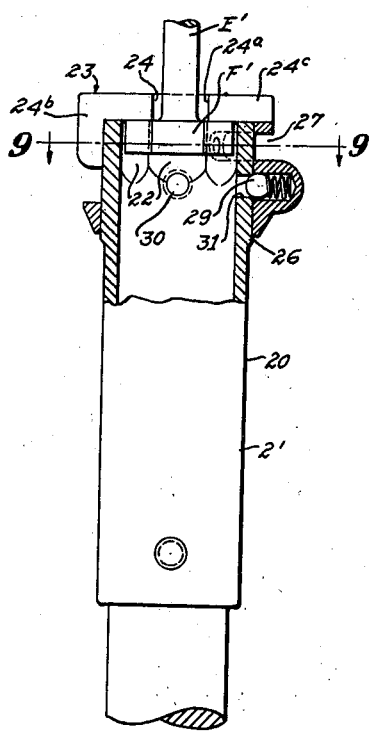
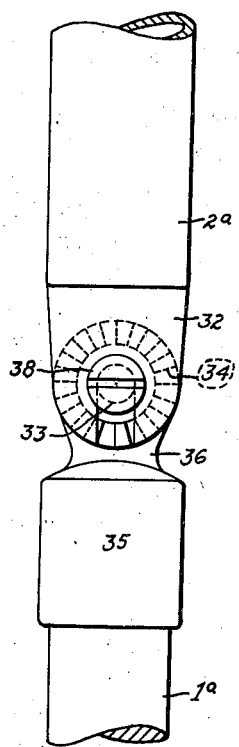
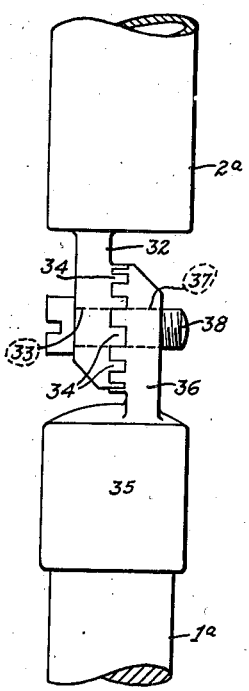
INVENTOR
MELVIN T. TIPSORD
BY　　　
ATTORNEY Patented Mar. 19, 1940

2,194,411

UNITED STATES PATENT OFFICE 2,194,411

CLAMP STICK

Melvin T. Tipsord, St. Louis, Mo., assignor to James R. Kearney Corporation, St. Louis, Mo., a corporation of Missouri Application July 18, 1935, Serial No. 32,004

6 Claims. (Cl. 81—53)

This invention relates generally to clamp sticks of the type adapted for use in attaching clamps to or removing clamps from power lines, and more specifically to an improved clamp stick of this type which is capable of ready and convenient attachment to or detachment from the operating element of a clamp, the predominant object of the invention being to provide a clamp stick having an improved clamp-engaging head which is so constructed and arranged, and is capable of such use, that the socket portion of said head which receives the operating element of a clamp may be locked in an open position to receive such operating element of a clamp, and locked in a closed position after the socket portion of the head has received the operating element of a clamp so as to prevent accidental disengagement of the clamp stick and a clamp.

Fig. 1 is a view partly in elevation and partly in vertical section, showing one form of the improved clamp stick in association with a clamp, a part of the handle portion of the clamp stick being broken away.

Fig. 2 is a section on line 2—2 of Fig. 1.

Fig. 3 is a horizontal section on line 3—3 of Fig. 2.

Fig. 4 is a fragmentary elevation of a portion of the head of the improved clamp stick, with a portion of a clamp associated therewith.

Fig. 5 is a horizontal section on line 5—5 of Fig. 1.

Fig. 6 is a fragmentary side elevation of another form of the invention.

Fig. 7 is a horizontal section on line 7—7 of Fig. 6.

Fig. 8 is a view partly in elevation and partly in vertical section taken on line 8—8 of Fig. 7.

Fig. 9 is a horizontal section on line 9—9 of Fig. 8.

Fig. 10 is a side elevation illustrating a form of the improved clamp stick having a pole or handle portion which is removable attached to the head of the clamp stick.

Fig. 11 is an elevation of the structure illustrated in Fig. 10, but showing same as it appears when viewed from a different angle.

In the drawings, wherein are shown for purposes of illustration, merely, several embodiments of the invention, A illustrates in Figs. 1 to 5, inclusive, a clamp which is adapted to be applied to a power line for the purpose of making electrical connection therewith. The clamp A includes a fixed jaw B with which is associated suitable clamping means C which serve as means for mechanically and electrically attaching a lead-off wire or jumper to the clamp. The clamp A includes a movable jaw D which is movable toward and from the fixed jaw B, said movable jaw C when moved toward the fixed jaw B being adapted to clamp a power line between said jaws in an obvious manner. Movement is imparted to the movable jaw D by a screw-threaded operating element E, which at its outer or lower end is provided with an eye F.

The improved clamp stick is designated generally in Figs. 1 to 5, inclusive, by the reference character S, and said clamp stick includes an elongated pole 1 which serves as a handle, said pole being formed of suitable wood treated to give to same the maximum electrical insulating properties. Fixed to an end of the pole 1 is a head 2 which includes a tubular element 3, an end portion of said pole 1 being extended into an end of said tubular element 3, as indicated by dotted lines in Fig. 1, and said head being securely fixed to said pole through the instrumentality of pins 4 which are passed in opposite directions through openings formed through the wall of said tubular element and through said pole.

At its outer or upper end the tubular element 3 is provided with a wall portion 5 through which is formed an opening 6 shaped as shown most clearly in Fig. 3; that is to say, said opening 6 includes a central circular portion 6ª from which extensions 6ᵇ project in opposite directions. The opening 6, when measured from end to end of the extension thereof, is of substantially the same length as the inner diameter of the tubular element 3, and the wall portions 5 at opposite sides of the opening 6 are of more or less tapered formation, being provided with inclined, lower faces 5' (Fig. 2) which extend downwardly and outwardly from the lower end of the circular, central portion of the opening 6 to the inner face of the tubular element. The extensions 6ᵇ of the opening 6 are formed in the opposed tapered portions of the wall portion 5, as shown in Fig. 2.

Mounted for rotary movement on the slightly enlarged portion 7 of the tubular element 3 is a cap 8, which includes a top wall 8ª from the margin of which a downwardly directed flange 8ᵇ is extended, the inner face of said flange being in moving contact with the outer face of the upper, enlarged portion 7 of the tubular element. The flange is provided with an elongated opening 9 formed therethrough, and this opening receives the head portion of a screw 10 which is screwed into a screw-threaded opening formed in the wall portion 5 of the tubular element 3.

The head portion of the screw 10 limits rotary movement of the cap about the tubular element, as when the limit of rotation of the cap in either direction is reached an end of the slot contacts with the head portion of the screw. The extension of the head portion of the screw 10 into the opening 9 also prevents accidental disengagement of the cap from the tubular element. The flange 8b of the cap is also provided with a pair of apertures 11 and 12, which are located approximately 90° from each other, as shown most clearly in Fig. 3. The apertures 11 and 12 serve as keepers for a ball 13 which serves as a locking means for locking the cap in various positions relative to the tubular element 3. The ball 13 is located in an opening 14 formed in the wall portion 5 of the tubular element, a coil spring 16 being interposed between the base of the opening 14 and said ball, whereby said ball is forced in an outward direction by said coil spring.

The top wall of the cap 8 has an opening 17 formed therethrough which in shape resembles the opening 6 formed through the top wall portion of the tubular element 3. That is to say, the opening 17 has a central, circular portion 17a, and substantially straight extensions 17b project outwardly in opposite directions from said central, circular portion. The extensions 17b extend to the outer face of the cap, which causes notches 18 to appear at opposite sides of the cap, as shown in Fig. 4. Also, at opposite sides of the central, circular portion of the opening 17 curved notches 19 are provided which serve a function to be hereinafter set forth.

When it is desired to employ the improved clamp stick in applying a clamp to a power line, the eye F of the operating element E is introduced into the socket of the head 2 of the clamp stick, the cap 8 first being positioned so that the opening 17 thereof is completely alined with the correspondingly shaped opening 6 formed in the top wall portion 5 of the tubular element 3. When said openings 6 and 17 are so alined the eye of the operating element of the clamp may be passed inwardly into the socket of the head through the alined central portions and extensions of the openings. When the cap 8 is positioned to provide alinement of the openings 6 and 17, the locking ball 13 is extended into the aperture 11 of said cap, whereby the socket of the head 2 of the clamp stick is locked in an open position.

When the eye F of the operating element E of the clamp has been introduced into the socket of the head 2, the cap is rotated 90° about the tubular element, and when this position is reached the ball 13 snaps into the aperture 12 of the cap to lock the cap in the position to which it has been moved. Also, when the cap is in this position the opening 17 formed in the top wall of the cap is disposed at a substantial right angle to the opening 6 in the upper wall portion 5 of the tubular element 3, as shown in Fig. 5. When the cap 8 is moved to the position shown in Fig. 5, the portions 8c of the top wall of the cap move into overhanging relation with respect to the eye F of the clamp-operating element E, as shown most clearly in Fig. 1, and thus said eye is prevented from being accidentally disengaged from the head of the clamp stick. It will be noted that when the eye F of the operating element E of the clamp is locked in place within the head of the clamp stick, portions of said eye are received by the curved notches 19 at opposite sides of the circular, central portion of the opening 17 of the cap 8.

When the clamp has been attached to the clamp stick as described and it is desired to attach the clamp to a power line, the clamp stick is moved longitudinally of the operating element of the clamp until the clamp rests upon the top wall of the cap 8, the lower portion of the extension B' of the clamp at such time being received in one of the notches 18 in the cap 8. This provides such support for the clamp as to prevent accidental displacement of the clamp relative to the head of the clamp stick during movement of the clamp and clamp stick vertically to apply the clamp to an overhead wire. When the position of the wire is reached the clamp is moved onto the wire so that said wire is extended between the fixed jaw B and the movable jaw D, and the clamp stick is then moved downwardly relative to the operating element of the clamp until the eye F thereof is again positioned in the openings 6 and 17. The clamp stick may then be rotated about its axis to rotate the screw-threaded operating element E of the clamp and thereby move the movable jaw D of the clamp upwardly to clamp the wire between said movable jaw and the fixed jaw B of the clamp. In connection with the axial rotation of the clamp stick when the movable jaw of the clamp is being moved upwardly or downwardly, it is to be noted that the more or less universal connection between the clamp stick and said operating element of the clamp permits of said operating element being rotated when the clamp stick is extended at a slight angle relative to the axis of the operating element. This is important where it is not possible for an operator to assume a position immediately beneath the clamp.

When the clamp has been securely clamped to the wire in the manner described, the clamp stick is moved upwardly relative to the operating element E of the clamp until the lower end portion of the extension B' of the clamp is received in one of the notches 18 of the cap 8 of the head 2. The clamp stick is then rotated approximately 90° relative to the cap 8 to again bring the openings 6 and 17 into complete registration, whereupon the clamp stick may be disengaged from the operating element of the clamp. In like manner, when it is desired to remove a clamp from a wire the clamp stick with the openings 6 and 17 in registration is moved onto the operating element E of the clamp, and said clamp stick is moved longitudinally of said operating element of the clamp until the lower portion of the extension B' of the clamp enters one of the notches 18 in the cap 8 of the clamp stick. The clamp stick is then rotated axially to move the opening 6 in the top wall of the tubular element 3 out of registration with the opening 17 in the cap 8, whereby the eye F of the operating element E of the clamp is locked within the head of the clamp stick. The clamp stick is then moved downwardly relative to the operating element of the clamp to bring the eye F thereof in the openings 6 and 17, whereupon the operating element of the clamp may be rotated with the aid of the clamp stick to move the movable jaw of said clamp away from the wire. When the movable jaw of the clamp has been moved away from the wire as described the desired distance, the clamp stick is moved upwardly relative to the operating element of the clamp until the clamp is supported on the upper end of the head 2 thereof, whereupon the clamp may be disengaged from the wire and lowered in locked relation with respect to the clamp stick.

It is important to note that because of the locking ball 13 and the apertures 11 and 12, the socket of the head may be positively locked in open and closed positions, thus insuring proper registration of the openings 6 and 17 when said socket is in the open position and preventing accidental displacement of the operating element of a clamp from said socket when same is in the closed position.

As has been stated herein, the clamp A illustrated in Figs. 1 to 5, inclusive, is provided with an operating element E which has an eye F at its outer end. There is also in common use a clamp, the operating element of which includes at its outer end a multi-faced element, as shown in Figs. 6, 7, and 8, wherein E' designates the operating element of a clamp and F' designates a hexagonal element arranged at the outer end of said operating element. In Figs. 6, 7, 8, and 9 is illustrated a form of clamp stick adapted for use with a clamp having the hexagonal element associated with the operating element thereof. In this form of the invention the tubular element 20 is provided with an inverted T-shaped slot 21, which is formed at the top thereof, said slot including a vertically extended portion open at the top of the tubular element, as shown in Fig. 6, and a wider horizontal portion which is disposed some distance below the top edge of the tubular element. The inner face of the tubular element 20 at the top thereof is provided with a plurality of faces 22 arranged in correspondence with the faces of the element F' on the operating element E' of the clamp. The structure shown in Figs. 6 to 9, inclusive, includes also a cap 23 having an opening 24 formed in its top wall shaped as shown in Fig. 7, said opening including a circular, central portion 24ª, a flared, forwardly extending portion 24ᵇ which is open at its outer end, and a substantially straight extension 24ᶜ. The open end of the flared portion 24ᵇ of the opening 24 communicates with an inverted substantially T-shaped opening 25 formed in the side wall of the cap which corresponds in shape and dimensions to the T-shaped opening 21 formed in the side wall of the tubular element 20 at the top thereof. The cap 23 is mounted for rotary movement about the slightly enlarged upper portion 26 of the tubular element 20, said cap being provided with an elongated slot 27 in which the head portion of a screw 28 is disposed. The screw 28 is seated in a screw-threaded opening formed in the wall of the tubular element 20 as shown in Fig. 9, the head of said screw serving to limit rotary movement of the cap 23 and acting to prevent accidental displacement of the cap from the tubular element. The cap also is provided with a spring-pressed locking ball 29 which is adapted to enter apertures 30 and 31 in the cap 23 in order to lock said cap in different positions to which it has been moved.

In the use of this type of clamp stick the T-shaped openings 21 and 25 of the tubular element 20 and the cap 23, respectively, are alined to permit the lower portion of the operating element E' and the multi-faced element F' thereof to be moved laterally into the interior of the tubular element, the element F' passing through the wider, lower, horizontal portions of the alined openings, and the shank of the operating element passing through the upper, vertically disposed portions of the alined openings. The tubular element and cap are then subjected to relative rotary movement so as to move the openings out of registration with each other, as shown in Fig. 9, and thereby prevent accidental disengagement of the head 2' of the clamp stick and the operating element of the clamp. The form of the invention illustrated in Figs. 6 to 9 is used just as is the form of the invention shown in Figs. 1 to 5, and because the manner of use of the last-mentioned form has been previously described herein, it need not be again described in connection with the form of the invention shown in Figs. 6 to 9.

The poles providing the handles of the two forms of the invention shown in Figs. 1 to 9, inclusive, are permanently fixed to the tubular elements of said structures, but instead of such permanent attachment of the poles I may provide means for removably attaching the heads of the clamp sticks to the poles thereof, as shown in Figs. 10 and 11. In these views 1ª designates the pole of the structure and 2ª designates the head thereof. The head 2ª is provided with an extended portion 32 which is provided with an opening 33 about which is formed a plurality of radial splines 34. In like manner the pole 1ª has fixed to an end thereof a cap 35 which is provided with an extension 36 having an opening 37 formed therethrough, and formed on said extension about the opening 37 is a plurality of radial splines 37'. When the pole and the head of the structure shown in Figs. 10 and 11 are attached, the splines on the portion 32 and the extension 36 are arranged in engaging relation with each other as shown most clearly in Fig. 11, and a bolt 38 is extended through the openings 33 and 37 of said portion 32 and said extension 36 to secure said parts together, said bolt being in screw-threaded engagement with screw-threads formed within the opening 37 of the extension 36.

I claim:

1. An implement for handling a hot-wire clamp having a body and an elongated screwthreaded shank having an enlarged head; the implement including a handle, an elongated hollow socket mounted thereon and constructed to receive the shank and its head and an element mounted for circumferential oscillation on the open end of the socket, the element and socket being constructed to lock the head from withdrawal when the element and socket are relatively rotated in opposite directions and to a predetermined extent but permitting withdrawal or insertion of the head and shank when the element and socket are relatively rotated in the other direction to a predetermined extent, the element having means for engaging the body of the clamp, for unitary movement with the body, upon an upward thrust of the handle and socket, the socket having means for engaging the shank head for unitary rotative movement upon a retraction of the handle and socket relative to the body.

2. An implement for handling a hot-wire clamp having a body and a screw threaded actuating shank formed at its lower end with a flattened transversely enlarged head, the implement including a pole supported socket and a cap rotatable thereon, the cap and socket each having a slot to receive the head, the slots when in registered position permitting entry of the head into the socket and when out of register preventing the withdrawal of the head, the cap being rotatable a limited distance from its registering position, the interior of the socket being longer than the length of the shank below said clamp body and having the interior diameter larger than the major diameter of the head, the slot in the socket being constructed and arranged to engage the head for unitary rotation when the socket is pulled downward, the slot in the cap being constructed and arranged to engage the clamp body when the socket is moved upward and thus disengaged from the shank head whereby to hold the cap against turning movement while the socket is being turned to bring its slot into coincidence with the slot in the cap.

3. An implement for handling a hot wire clamp having a body and an elongated screwthreaded shank provided with an enlarged head; the implement including a handle, an elongated hollow socket mounted thereon and constructed to receive a portion of the shank of the clamp and the head thereof, and an element mounted for circumferential oscillation on the socket, the element and socket being constructed to lock the head of the shank of the clamp from withdrawal from the socket when the element and socket are relatively rotated to one related condition but permitting withdrawal or insertion of the head and shank of the clamp when the element and socket are relatively rotated to another related condition, the element having means for engaging the body of the clamp upon movement of the socket inwardly with respect to the shank of the clamp, and the socket having means for engaging the shank head for unitary rotary movement upon movement of the socket outwardly with respect to the shank of the clamp.

4. For use with a hot-wire clamp having a downwardly elongated clamp-actuating screw shank provided with a diametrically elongated head at its lower end, the body of the clamp having a downwardly extending member; a clamp handling device including a substantially cylindrical hollow socket having a length greater than the length of said shank and an internal diameter greater than the major diameter of the head, the socket having a supporting pole, the upper end of the socket being formed with inwardly turned flanges defining a diametrically extending slot, a cap rotatably mounted upon the socket and having inwardly turned flanges defining a diametrically extending slot, the cap being rotatable upon the socket to bring the slot of the cap into registration with the slot of the socket or into a position at right angles thereto, and coacting means on the socket and cap limiting the rotative movement of the socket with relation to the cap to an angular distance of 90° from a position where the slots are coincident, each end of the cap slot being constructed and arranged to receive the said member on the body of the clamp between the flanges defining said slot, whereby the ends of the flanges of the socket will engage on each side of the head of said screw when the socket is pulled downward and whereby the slot of the cap will engage said member on the body of the clamp when the socket and cap are shifted upward to thus release the head and hold the cap from rotation while the socket is turned to bring the two slots into register with each other.

5. An implement for handling a hot wire clamp having a body and an elongated screwthreaded shank provided with an enlarged head the implement including a handle, an elongated hollow socket mounted thereon and constructed to receive a portion of the shank of the clamp and the head thereof, and an element mounted for circumferential oscillation on the socket, the element and socket being constructed to lock the head of the shank of the clamp from withdrawal from the socket when the element and socket are relatively rotated to one related condition but permitting withdrawal or insertion of the head and shank of the clamp when the element and socket are relatively rotated to another related condition, the element having means for engaging the body of the clamp upon movement of the socket inwardly with respect to the shank of the clamp whereby said element may be held immovable when it is desired to oscillate the socket with respect to the element, and the socket having means for engaging the shank head of the clamp for unitary rotation upon movement of the socket outwardly with respect to the shank of the clamp, and means for retaining said element and socket in related positions to which they have been adjusted.

6. An implement for handling a hot wire clamp having a body and an elongated screwthreaded shank provided with an enlarged head the implement including a handle, an elongated socket mounted thereon and constructed to receive a portion of the shank of the clamp and the head thereof, and an element mounted for circumferential oscillation on the socket, the element and socket being constructed to lock the head of the shank of the clamp from withdrawal from the socket when the element and socket are relatively rotated to one related condition but permitting withdrawal or insertion of the head and shank of the clamp when the element and socket are relatively rotated to another related condition, the element having means for engaging the body of the clamp upon movement of the socket inwardly with respect to the shank of the clamp whereby said element may be held immovable when it is desired to oscillate the socket with respect to the element, and the socket having means for engaging the shank head of the clamp for unitary rotation upon movement of the socket outwardly with respect to the shank of the clamp, means for limiting relative rotative movement of the element and socket, and means for retaining said element and socket in related positions to which they have been adjusted.

MELVIN T. TIPSORD.